United States Patent
Yang et al.

(10) Patent No.: US 7,606,306 B2
(45) Date of Patent: Oct. 20, 2009

(54) OUTPUT METHOD FOR IMPROVING VIDEO IMAGE QUALITY

(75) Inventors: Ying-Chih Yang, Hsinchu (TW); Tsung-Hsien Lin, Taichung (TW); Jen-Yi Liao, Hsinchu (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 1008 days.

(21) Appl. No.: 10/907,441

(22) Filed: Apr. 1, 2005

(65) Prior Publication Data
US 2006/0078045 A1 Apr. 13, 2006

(30) Foreign Application Priority Data
Oct. 7, 2004 (TW) ............................... 93130327 A

(51) Int. Cl.
*H04N 7/12* (2006.01)

(52) U.S. Cl. ............. 375/240.12; 375/240; 375/240.01; 375/240.25

(58) Field of Classification Search ................. 375/240, 375/240.01, 240.12, 240.24, 240.25
See application file for complete search history.

(56) References Cited

U.S. PATENT DOCUMENTS
6,018,368 A * 1/2000 Kim et al. .............. 375/240.24

* cited by examiner

*Primary Examiner*—Allen Wong
(74) *Attorney, Agent, or Firm*—Jianq Chyun IP Office

(57) ABSTRACT

An output method for improving video image quality is provided. First, a frame data of a first frame is received, wherein the first frame may coincide with a first type or a second type. Thereafter, the first frame is subjected to a signal process step to output a processed first frame with a first standard, wherein the processed first frame comprises a first signal to noise (S/N) ratio. Next, a frame data of a second frame with a second standard is received, wherein the second frame coincides with a third type. Thereafter, a first decompression process of frame data is performed on the second frame to output a processed second frame with the first standard, wherein the processed second frame comprises a second S/N ratio. In addition, a difference between the first S/N ratio and the second S/N ratio is smaller than a predetermined minimum tolerance.

12 Claims, 4 Drawing Sheets

OUTPUT METHOD FOR IMPROVING VIDEO IMAGE QUALITY

CROSS-REFERENCE TO RELATED APPLICATION

This application claims the priority benefit of Taiwan application Ser. No. 93130327, filed Oct. 7, 2004.

BACKGROUND OF THE INVENTION

1. Field of the Invention

The present invention relates to an output method for improving image quality. More particularly, the present invention relates to an output method for improving video image quality for image compression.

2. Description of Related Art

In general, the amount of digital video data is very large. Therefore, in order to store the video data within a smaller memory space and maintain high speed video data transmission, the video data has to be compressed. Conventionally, the data compression is a process for removing the unnecessary information of video data to reduce the amount of data. For example, if previous and next frames are similar, the previous frame may be retained and the portion, existing in both frames, of the next frame may be removed (i.e., only the portions of the next frame, different from the previous frame are retained). Accordingly, the amount of digital video data may be significantly reduced.

Conventionally, in the motion picture experts group (MPEG) specification, the decoding of video image may generally produce three types of frames, namely, intra-coding frame (I frame), prediction frame (P frame) and bidirectional frame (B frame) respectively. In the decoding process of high definition digital television or high definition digital video disc (e.g., digital versatile disc, DVD), the memory capacity for storing frame data of I frame, P frame and B frame is very large. If the memory capacity is limited, the frame data stored in the memory has to be compressed appropriately to release a couple of memory space for other decoding process. Thereafter, if the frame data of the I frame and the P frame has to be compressed simultaneously, the image quality of the B frame decoded according to the compressed I frame and P frame are reduced. Therefore, the image quality of the picture group is seriously deteriorated. According to the reason described above, only the frame data of the B frame is compressed in the conventional process.

FIG. 1 is an output procedure of a conventional video data. Referring to FIG. 1, in the conventional output procedure of a video data, the decoded sequence 10 sequentially includes I frame 110a, P frame 120a, B frames 130a and 130b, P frame 120b, B frames 130c and 130d, P frame 120c, B frames 130e and 130f. It is noted that, the I frame 110a, P frames 120a, 120b and 120c is coincide with the first standard, and the B frames 130a, 130b, 130c, 130d, 130e and 130f coincide with the second standard. The data amount of the first standard is generally larger than that of the second standard. In addition, the second standard may be, for example, the conventional phase alternation by line (PAL) standard or the national television system committee (NTSC) standard.

The frame data of the decoding sequence 10 has to be rearranged to obtain the frame data of a display sequence 20, wherein the display sequence 20 includes I frame 110a, B frames 132a and 132b, P frame 120a, B frames 132c and 132d, P frame 120b, B frames 132e and 132f and P frame 120c sequentially. It is noted that, the B frames 130a, 130b, 130c, 130d, 130e and 130f with the second standard have to be decompressed via a decompression process to obtain the B frames 132a, 132b, 132c, 132d, 132e and 132f with the first standard performed in the display sequence 20.

In the display sequence 20, the B frames 132a, 132b, 132c, 132d, 132e and 132f has smaller S/N ratio (signal to noise ratio) compared to the I frame 110a and the P frames 120a, 120b and 120c. In other words, the B frames 132a, 132b, 132c, 132d, 132e and 132f are more blurred than the I frame 110a and the P frames 120a, 120b and 120c. Therefore, if only the frame data of the B frame is compressed, the image quality is not uniform and may look like sometimes clear and sometimes blurred.

SUMMARY OF THE INVENTION

Accordingly, the present invention is directed to an output method for improving video image quality, and enhancing the smoothness and stability of the displaying image quality.

In addition, the present invention is related to an output method for minimizing the differential S/N ratios between the outputted frame data in order to improving video image quality.

According to one embodiment of the present invention, the output method for improving video image quality may comprise the following steps. First, a frame data of a first frame is received, wherein the first frame may coincide with a first type or a second type. Next, the first frame is subjected to a signal process to output a processed first frame with a first standard and a first signal to noise (S/N) ratio. Next, a frame data of a second frame with a second standard is received, wherein the second frame coincides with a third type. Thereafter, a first decompression process of frame data is performed on the second frame to output a processed second frame with the first standard and a second S/N ratio. In addition, a difference between the first S/N ratio and the second S/N ratio is smaller than a predetermined minimum tolerance.

In one embodiment of the present invention, the signal process step comprises a step of performing a compression process of frame data, and a step of performing a second decompression process of frame data.

In one embodiment of the present invention, the signal process on frame data of the first frame is implemented by using, for example but not limited to, a wave filter module.

In one embodiment of the present invention, a frame of the first type comprises an intra-coding frame, a frame of the second type comprises a prediction frame, and a frame of the third type comprises a bi-directional frame.

In one embodiment of the present invention, the second standard comprises a phase alternation by line (PAL) standard or a national television system committee (NTSC) standard.

According to another embodiment of the present invention, the output method for improving video image quality may comprise the following steps. First, a frame data of a first frame comprising a first S/N ratio is received, wherein the first frame coincides with a first type. Next, the first frame is subjected to a signal process to output a processed first frame with a first standard and a second S/N ratio, wherein the second S/N ratio is smaller than the first S/N ratio. Next, a frame data of a second frame comprising a third S/N ratio is received, wherein the second frame coincides with a second type. Next, the second frame is subjected to the signal process to output a processed second frame with the first standard and a $4^{th}$ S/N ratio, wherein the $4^{th}$ S/N ratio is smaller than the third S/N ratio. Thereafter, a frame data of a third frame with a second standard is received, wherein the third frame coincides with a third type. Then, a first decompression process of frame data is performed on the third frame to output a processed third frame with the first standard and a $5^{th}$ S/N ratio.

In one embodiment of the present invention, the signal process step comprises a step of performing a compression process of frame data, and a step of performing a second decompression process of frame data.

In one embodiment of the present invention, the signal process on the frame data of the first frame and the frame data of the second frame are implemented by using, for example but not limited to, a wave filter module.

In one embodiment of the present invention, after the signal process step is performed, a difference between the second S/N ratio and the $5^{th}$ S/N ratio and a difference between the $4^{th}$ S/N ratio and the $5^{th}$ S/N ratio are smaller than a predetermined minimum tolerance.

In one embodiment of the present invention, a frame of the first type comprises an intra-coding frame, a frame with the second type comprises a prediction frame, and a frame of the third type comprises a bi-directional frame.

In one embodiment of the present invention, a frame of the first type comprises a prediction frame, a frame of the second type comprises an intra-coding frame, and a frame of the third type comprises a bi-directional frame.

In one embodiment of the present invention, the second standard comprises a phase alternation by line (PAL) standard or a national television system committee (NTSC) standard.

Accordingly, in the output method for improving video image quality of the present invention, the image qualities of the intra-coding frame and the prediction of the display sequence frame are processed to coincide with the image quality of the compressed bi-directional frame. Therefore, the displaying image quality may be more stable. In other words, the intra-coding frame, the prediction frame and the bi-directional frame of the display sequence have similar S/N ratios.

One or part or all of these and other features and advantages of the present invention will become readily apparent to those skilled in this art from the following description wherein there is shown and described one embodiment of this invention, simply by way of illustration of one of the modes best suited to carry out the invention. As it will be realized, the invention is capable of different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
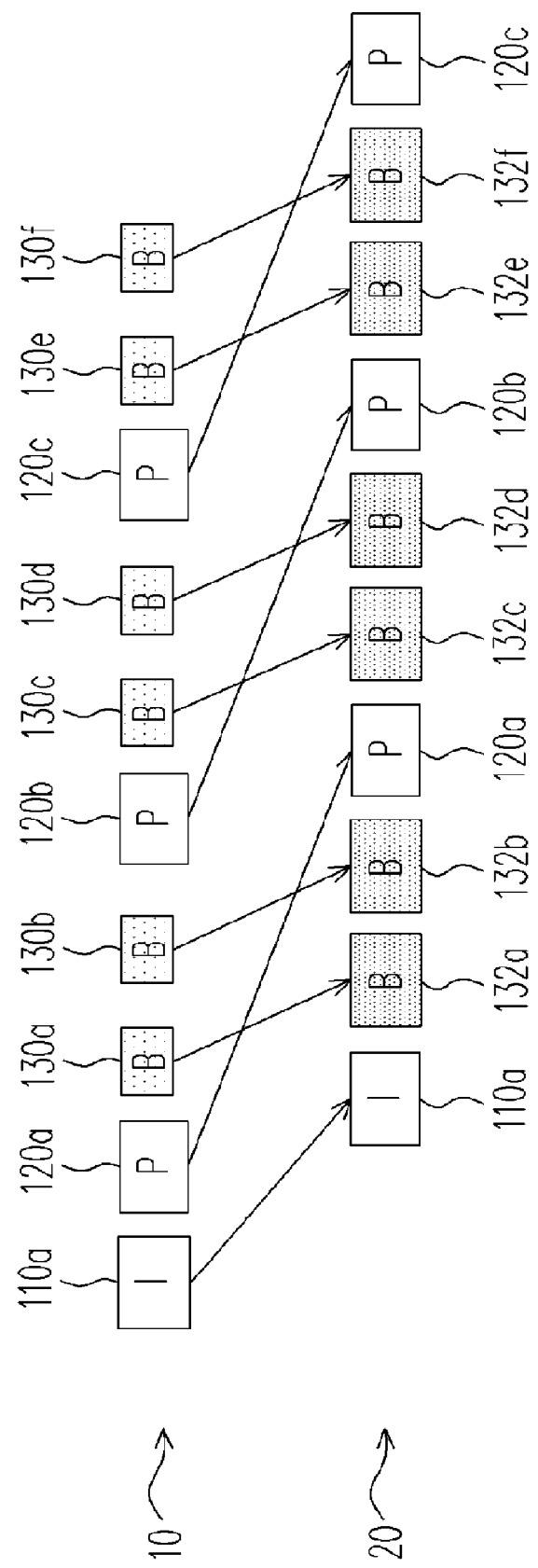
FIG. 1 is a output procedure of a conventional video data.
Figure 2:
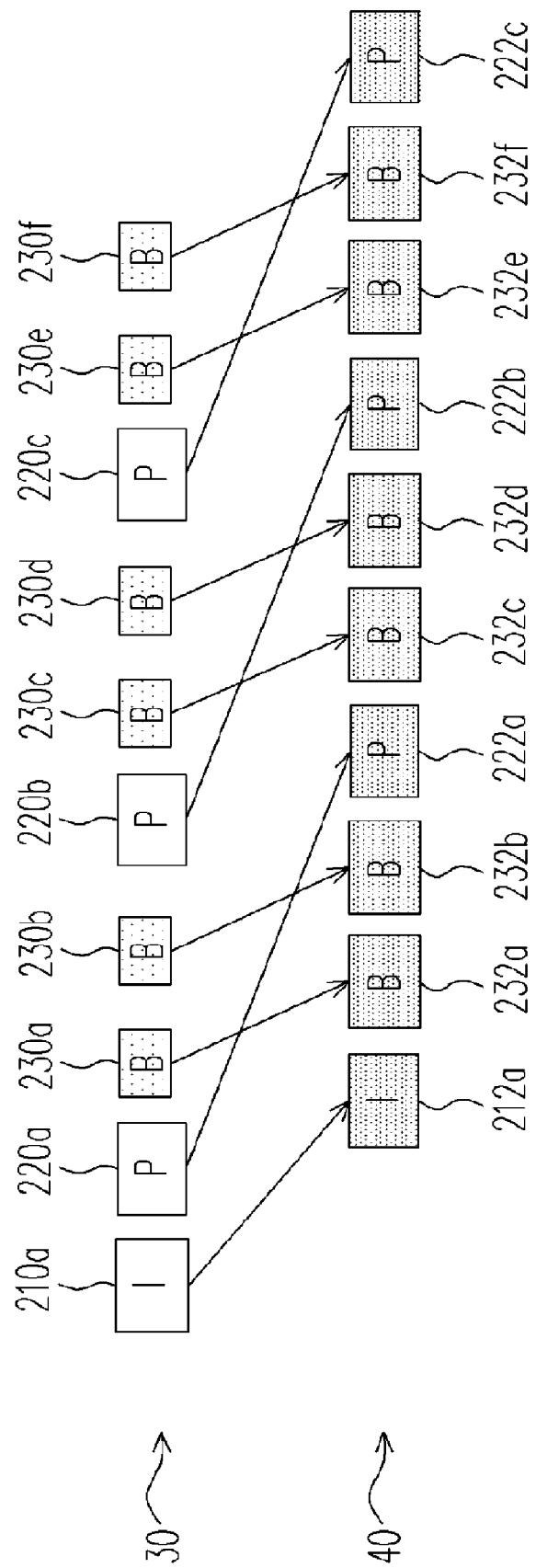
FIG. 2 is a schematic view illustrating an output method for improving video image quality according to one embodiment of the present invention.
Figure 3A:
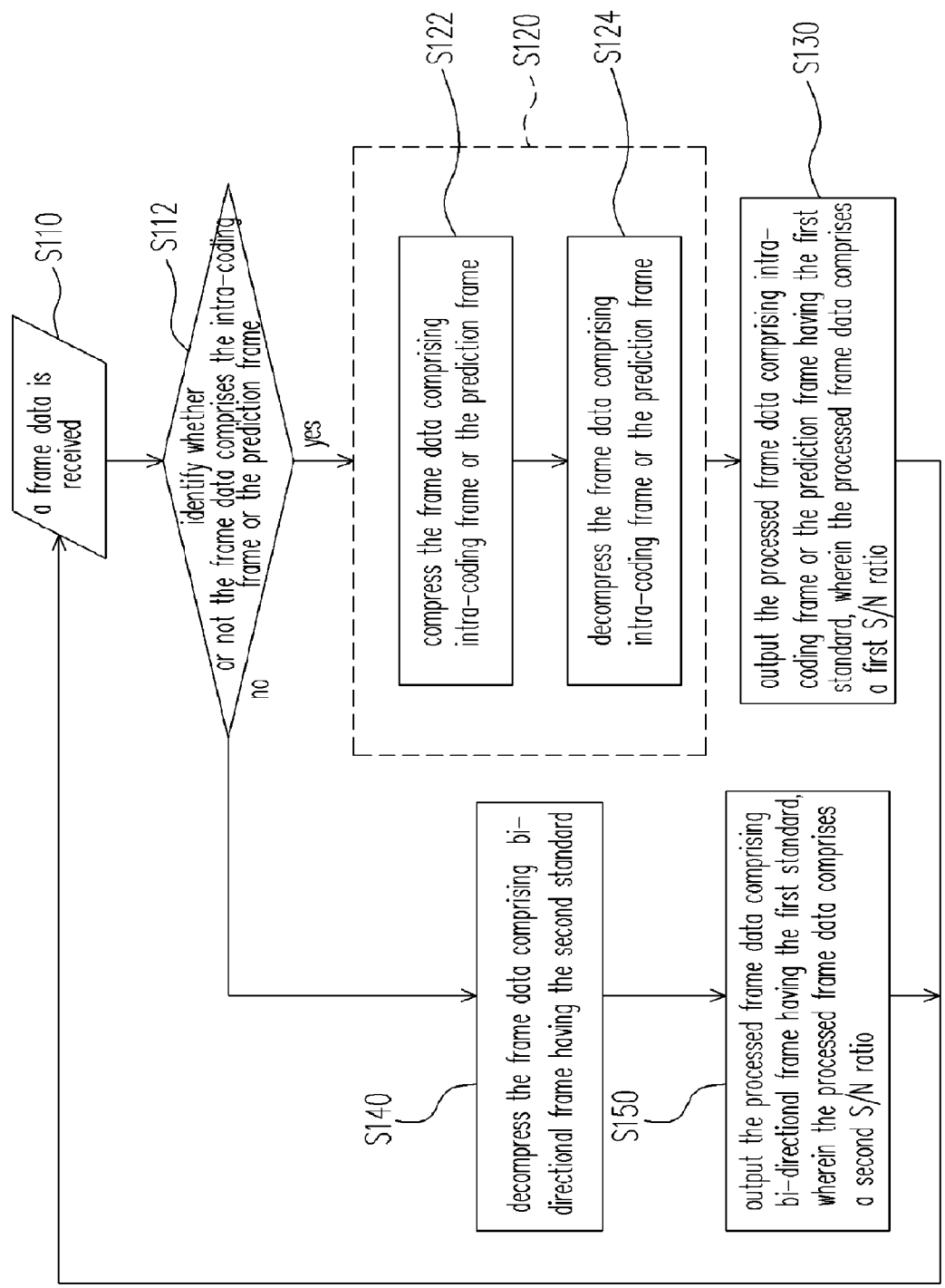
FIG. 3A is a flowchart illustrating an output method for improving video image quality according to one embodiment of the present invention.

FIG. 2 is a schematic view illustrating an output method for improving video image quality according to one embodiment of the present invention. FIG. 3A is a flowchart illustrating an output method for improving video image quality according to one embodiment of the present invention. Referring to FIG. 2 and FIG. 3A, first, a frame data of decoding sequence 30 is processed and rearranged to obtain a frame data of a display sequence 40. In one embodiment of the present invention, the decoding sequence 30 may comprise, for example in a sequence but not limited to, intra-coding frame 210a, prediction frame 220a, bi-directional frames 230a and 230b, prediction frame 220b, bi-directional frame 230c and 230d, prediction frame 220c, and bidirectional frames 230e and 230f.

The intra-coding frame 210a and prediction frames 220a, 220b and 220c of the decoding sequence 30 are converted into the intra-coding frame 212a and the prediction frames 222a, 222b and 222c of the display sequence 40 by a signal process step S120. The intra-coding frame 212a and the prediction frames 222a, 222b and 222c of the display sequence 40 coincide with a first standard and have a first S/N ratio. In addition, the bi-directional frames 230a, 230b, 230c, 230d, 230e and 230f of the decoding sequence 30 are converted into the bi-directional frames 232a, 232b, 232c, 232d, 232e and 232f of the display sequence 40 by a decompression process of frame data S140. The bi-directional frames 230a, 230b, 230c, 230d, 230e and 230f of the decoding sequence 30 coincide with a second standard, and the bi-directional frames 230a, 230b, 230c, 230d, 230e and 230f of the display sequence 40 coincide with the first standard and have a second S/N ratio.

In one embodiment of the present invention, the content of the data used in the first standard is larger than that used in the second standard. In another embodiment, the second standard may comprises PAL standard or NTSC standard. In addition, the image standard for the first standard of the present invention is not limited to one described above. It should be noted that, a difference between the first S/N ratio and the second S/N ratio is smaller than a predetermined minimum tolerance. In other words, in the display sequence 40, the image qualities of the intra-coding frame, the prediction frame and the bi-directional frame are similar. Therefore, the overall image quality may be more stable. Hereinafter, the process flow of the output method for improving video image quality of the present invention will be described in detail.

Referring to FIG. 3A, first, a frame data from a decoding module (not shown) is received (at step S110). In addition, the frame data received at step S110 may be, for example, first type, second type or third type. In one embodiment of the present invention, a frame of the first type may comprise an intra-coding frame, a frame of the second type may comprise a prediction frame, and a frame of the third type may comprise a bi-directional frame. In one embodiment of the present invention, the frame data received in the step S110 may be the decoding sequence 30.

Thereafter, the frame data received at step S110 is determined to identify whether or not the frame data comprises the intra-coding frame or the prediction frame (at step S112). Next, if the frame data comprises the intra-coding frame or the prediction frame, the intra-coding frame or the prediction frame is subjected to a signal process (at step S120). Thus, a processed intra-coding frame or a processed prediction frame with the first standard comprising a first S/N ratio may be outputted (at the step S130). It is noted that, the signal processing, step at step S120, may comprise, for example, performing a compression process of frame data, at step S122, and then performing a decompression process of frame data, at step S124. In general, the compression process and decompression process used for bidirectional frame may also be used for the signal process step in the step S120.

Referring to FIG. 3A, if the received frame data does not include intra-coding frame or prediction frame, the bidirectional frame with the second standard may be, for example, processed by a decompression process of frame data at step S140. Thereafter, a processed bi-directional frame with the first standard may be output at step S150, and the processed bi-directional frame comprises a second S/N ratio.

In comparison with the conventional technology, the present invention includes the signal process step for intra-coding frame or the prediction frame, at S120, to output the processed intra-coding frame or processed prediction frame having a first S/N ratio. In one embodiment of the present invention, the difference between the first S/N ratio of the intra-coding frame and the prediction frame and the second S/N ratio of the bi-directional frame is smaller than a minimum tolerance. Therefore, the image qualities of the intra-coding frame, the prediction frame and the bi-directional frame of the display sequence 40 are similar, and thus the overall image quality of the display sequence 40 is more smooth and stable.

Figure 3B:
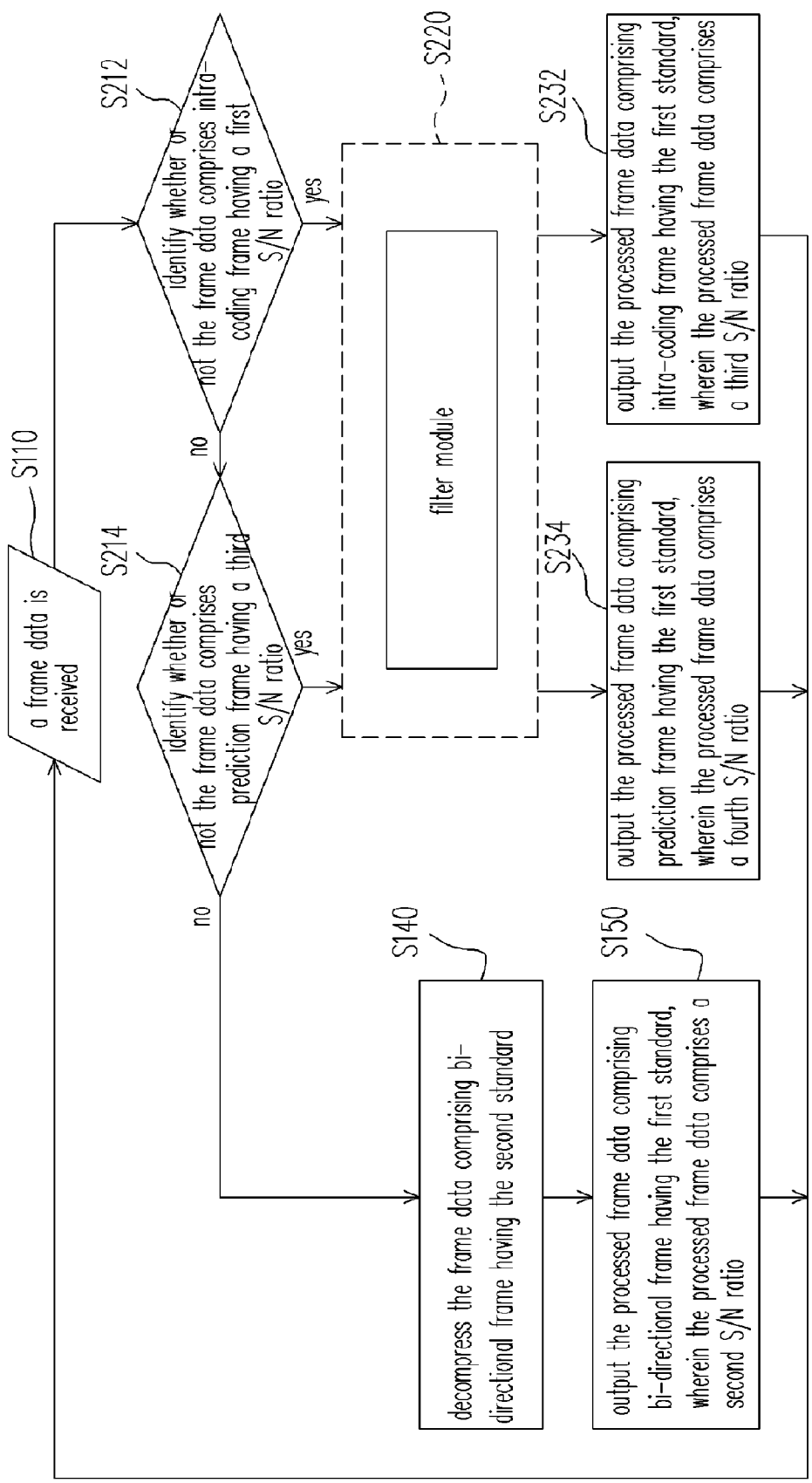
FIG. 3B is a flowchart illustrating an output method for improving video image quality according to another embodiment of the present invention.

FIG. 3B is a flowchart illustrating an output method for improving video image quality according to another embodiment of the present invention. It is noted that, the process of FIG. 3B is similar to that of FIG. 3A except for the following procedures. Referring to FIG. 3B, after step S110, if the received frame data is being identified to include intra-coding frame having a first S/N ratio in the step S212 (e.g., the intra-coding frame 210a), the intra-coding frame is subjected to a signal process at step S220. Thereafter, processed intra-coding frame with a first standard (e.g., the intra-coding frame 212a) is output at step S232, wherein the processed intra-coding frame comprises a second S/N ratio, and the second S/N ratio is smaller than the first S/N ratio.

Referring to FIG. 3B, if the received frame data is identified to include prediction frame S214 having a third S/N ratio (e.g., the prediction frames 220a, 220b and 220c), the prediction frame subjected to a signal process at step S220. Thereafter, processed prediction frame with the first standard (e.g., the prediction frames 222a, 222b and 222c) is output at step S234, wherein the processed prediction frame comprises a $4^{th}$ S/N ratio, and the $4^{th}$ S/N ratio is smaller than third S/N ratio. In addition, the signal process step in the step S220 may be performed by using, for example but not limited to, a wave filter module. In one embodiment of the present invention, the signal process step, at step S120, shown in FIG. 3A (e.g., including the compression process of frame data at step S122 and the decompression process of frame data at step S124) may also be provided for signal process step at step S220 shown in FIG. 3B and vice versa.

Accordingly, since the image quality of the intra-coding frame and the prediction frame are reduced by the signal process step in the step S220 to meet the image quality of the bidirectional frame after the decompression process in the step S140, the difference of the image qualities between the intra-coding frame, the prediction frame and the bi-directional frame of the display sequence 40 may be minimized. Therefore, the overall displaying image quality is more smooth. In addition, in order to further improve the smoothness of the displaying image quality, the difference between the second S/N ratio and the $5^{th}$ S/N ratio, and the difference between the $4^{th}$ S/N ratio and the $5^{th}$ S/N ratio can be rendered smaller than a predetermined minimum tolerance.

Accordingly, compared to the conventional technology, the output method for improving video image quality of the present invention provides a step to process the image quality of the intra-coding frame and the prediction of the display sequence frame to coincide with the image quality of the compressed bi-directional frame. Therefore, the displaying image quality may be rendered more stable. In other words, the intra-coding frame, the prediction frame and the bi-directional frame of the display sequence have similar S/N ratios.

In addition, the compression process and the decompression process for the bi-directional frame may also be used for processing the image quality of the intra-coding frame and the prediction frame. Therefore, the intra-coding frame, the prediction frame and the bi-directional frame of the display sequence may have similar image quality.

The foregoing description of the embodiment of the present invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An output method for improving video image quality implemented in a video processing device, the output method comprising the steps of:

receiving a frame data of a first frame, wherein the first frame coincides with a first type or a second type;

subjecting the first frame to a signal process by the video processing device to output a processed first frame with a first standard, wherein the processed first frame comprises a first signal to noise ratio;

receiving a frame data of a second frame with a second standard, wherein the second frame coincides with a third type; and performing a first decompression process of frame data on the second frame by the video processing device to output a processed second frame with the first standard, wherein the processed second frame comprises a second signal to noise ratio, wherein a difference between the first signal to noise ratio and the second signal to noise ratio is smaller than a predetermined minimum tolerance.

2. The output method of claim 1, wherein the signal process step comprises:
  performing a compression process of frame data; and
  performing a second decompression process of frame data.

3. The output method of claim 1, wherein the signal process is implemented using a wave filter module of the video processing device.

4. The output method of claim 1, wherein a frame of the first type comprises an intra-coding frame, a frame of the second type comprises a prediction frame, and a frame of the third type comprises a bi-directional frame.

5. The output method of claim 1, wherein the second standard comprises a phase alternation by line (PAL) standard or a national television system committee (NTSC) standard.

6. An output method for improving video image quality implemented in a video processing device, the output method comprising the steps of:
  receiving a frame data of a first frame, wherein the first frame coincides with a first type and comprises a first signal to noise ratio;
  subjecting the first frame to a signal process step by the video processing device to output a processed first frame with a first standard, wherein the processed first frame comprises a second signal to noise ratio, and the second signal to noise ratio is smaller than the first signal to noise ratio;
  receiving a frame data of a second frame, wherein the second frame coincides with a second type, and the second frame comprises a third signal to noise ratio;
  subjecting the second frame to the signal process by the video processing device to output a processed second frame with the first standard, wherein the processed second frame comprises a fourth signal to noise ratio, and the fourth signal to noise ratio is smaller than the third signal to noise ratio;
  receiving a frame data of a third frame with a second standard, wherein the third frame coincides with a third type; and
  performing a first decompression process of frame data on the third frame by the video processing device to output a processed third frame with the first standard, wherein the processed third frame has a fifth signal to noise ratio.

7. The output method of claim 6, wherein the signal process step comprises:
  performing a compression process of frame data; and
  performing a second decompression process of frame data.

8. The output method of claim 6, wherein the signal process step is implemented using a wave filter module of the video processing device.

9. The output method of claim 6, wherein after the signal process step is performed, a difference between the second signal to noise ratio and the fifth signal to noise ratio and a difference between the fourth signal to noise ratio and the fifth signal to noise ratio are smaller than a predetermined minimum tolerance.

10. The output method of claim 6, wherein a frame of the first type comprises an intra-coding frame, a frame with the second type comprises a prediction frame, and a frame of the third type comprises a bi-directional frame.

11. The output method of claim 6, wherein a frame of the first type comprises a prediction frame, a frame of the second type comprises an intra-coding frame, and a frame of the third type comprises a bi-directional frame.

12. The output method of claim 6, wherein the second standard comprises a phase alternation by line (PAL) standard or a national television system committee (NTSC) standard.

\* \* \* \* \*